United States Patent Office 3,503,669
Patented Mar. 31, 1970

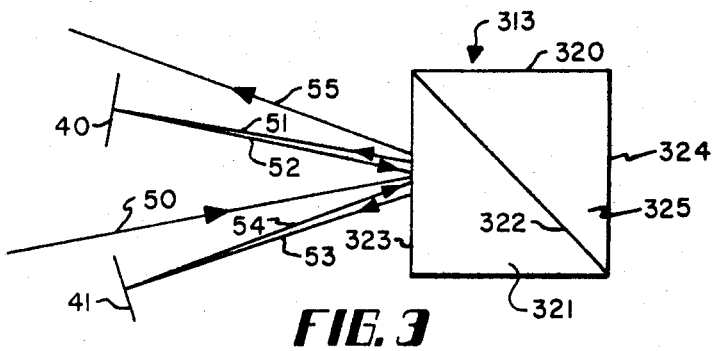
FIG. 3
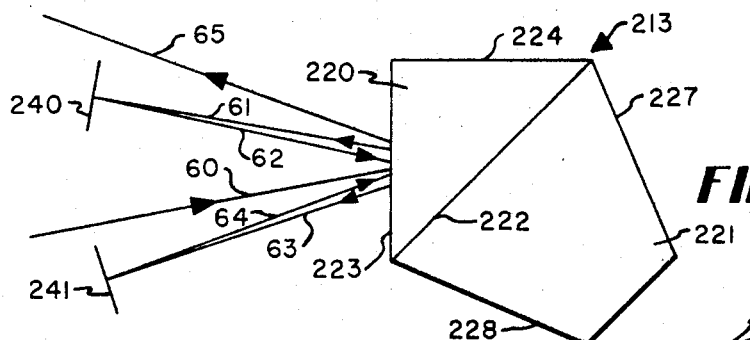
FIG. 4
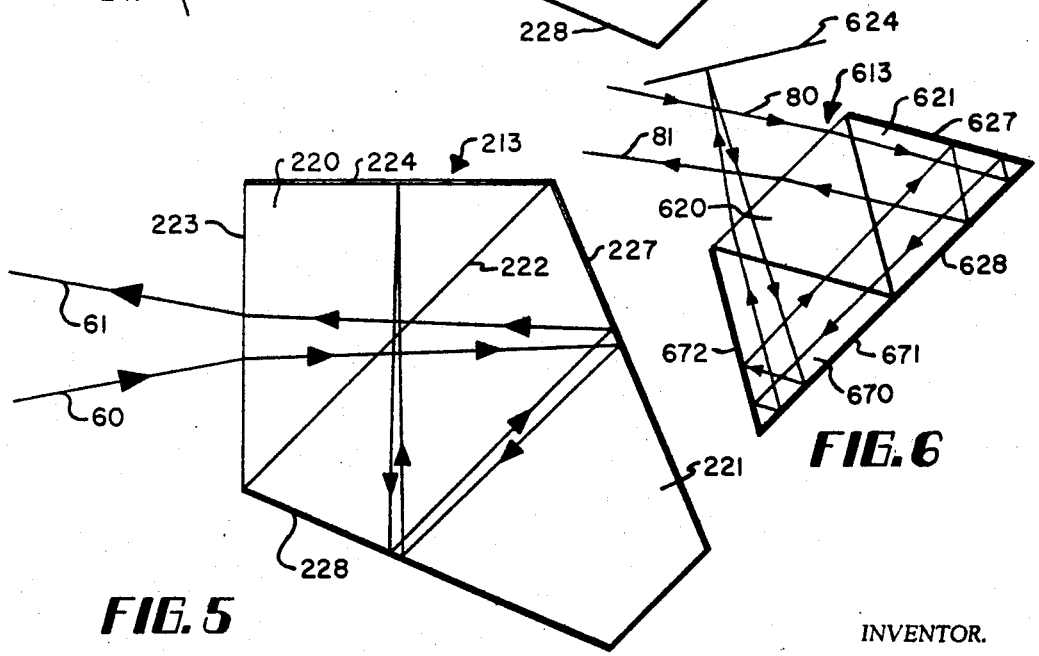
FIG. 5
FIG. 6
INVENTOR.
JAMES D. ZOOK
BY Donald R. Stone
ATTORNEY

3,503,669
**LIGHT BEAM CONTROL APPARATUS
AND METHOD**
James D. Zook, Burnsville, Minn., assignor to Honeywell
Inc., Minneapolis, Minn., a corporation of Delaware
Filed Nov. 14, 1966, Ser. No. 593,813
Int. Cl. G02f 1/26
U.S. Cl. 350—150     10 Claims

ABSTRACT OF THE DISCLOSURE

In a system for deflecting or modulating a light beam, reflective surfaces are positioned about an E-O crystal so as to direct the light beam through substantially the same volume of the crystal a plurality of times. In the deflection system, the deflection of the light beam on each passage through the deflector is cumulative, thereby increasing the number of resolvable spots obtained without utilizing substantial additional E-O material. In the modulation system, the rotation of the light beam's polarization vector is cumulative upon each traversal. Numerous arrangements for the reflective surfaces are described.

---

Figure 1:
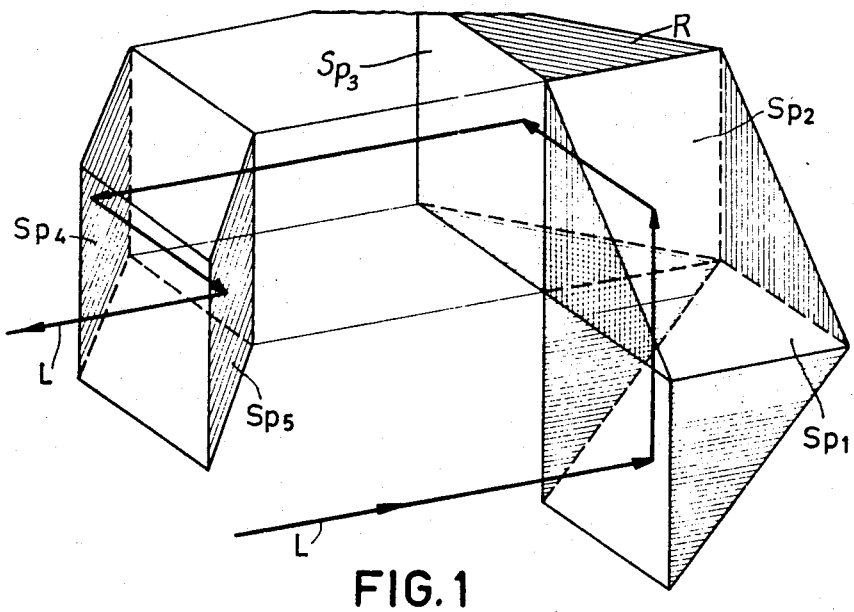

The invention is directed to apparatus and a method for controlling light beams; and, more particularly, to an apparatus and method for modulating or deflecting light beams with electro-optical materials.

Materials exhibiting the electro-optic effect become birefringent or change in degree of birefringence when an electric field is applied. That is, the index of refraction for ordinary and extraordinary light rays passing through such material change by differing amounts when an electric field is applied. It is known that such materials may be used to modulate or deflect light beams. Drawbacks of prior art light beam control devices utilizing electro-optical (E–O) material are that the deflection obtained in a passage through a prism of electro-optical material is extremely small and the voltage required to obtain significant modulation or deflection of a light beam is relatively high. Such high voltages often make power dissipation a problem in operating devices. In addition, very high quality electro-optical crystals are expensive and make use of such prior art structures impractical.

The present invention provides an improved method and apparatus which overcomes the prior art drawbacks. Light beam deflection or modulation is achieved by multiple passes of the beam through substantially the same volume of an electro-optical material.

In this specification, the term "light" is used to mean electromagnetic waves within the band of frequencies including infrared, visible, and ultraviolet light. Many materials are known to exhibit electro-optic effects. The E–O effect may be either linear or quadratic. Among those materials are solids like potassium dihydrogen phosphate (KDP) and potassium niobium tantalate (KTN) and liquids like nitrobenzene. If a paraelectric perovskite like KTN is used for the electro-optical prism, the crystal may be cut so that an electric field may be applied along one of the cubic axes of the crystal. Deflection then occurs when a light beam polarized in a direction parallel to that axis traverses a prism having nonparallel entrance and exit faces. The deflection is varied in an analog manner when the applied voltage is so varied. It is known that the deflection achievable in a single pass through such a prism is limited by the heating and other effects caused by high voltage application.

The number of resolvable spots obtainable in a light deflector is given by the equation $$N_r = \frac{\Delta_m}{\frac{\lambda}{D}}$$

where $\Delta_m$ is the total deflection angle, $\lambda$ is the wave length of the light, and $D$ is the diameter of the beam. The deflection angle is determined by the difference in the path lengths for opposite extremities of the beam passing through the electro-optical material and is approximately $$\frac{\Delta_n \cdot l}{D}$$

for small angles, where $\Delta_n$ is the change in refractive index for the ray of interest and $l$ is the path length difference in the E–O material between the two extremities of the beam. The number of resolvable spots can therefore be written as $$N_r \cong \frac{\Delta_n \cdot l}{\lambda}$$

Prior art devices have increased the deflection by passing the beam through successive crystals in a manner such that the path length differences are cumulative. The apparatus of the invention utilizes the strategic placement of reflective surfaces to redirect the light beam through substantially the same volume of crystal as that traversed during the first pass a plurality of times in such a manner that the path length differences resulting from each pass are cumulative. An increase in the number of resolvable spots is obtained without utilizing substantial additional electro-optical material. That advantage is important since the electro-optical material is normally the most expensive part of such a system.

E–O cells have also been used for light modulation. Normally, the light is polarized, directed through the E–O cell, and then through an analyzer. Varying the voltage applied to the E–O cell varies the intensity of light transmitted through the analyzer. Relatively high voltages are required to achieve large intensity variations when a single pass through the E–O cell is utilized. The present invention allows the light beam to be passed through the E–O cell a number of times. Therefore, the applied voltage can be significantly reduced without changing the E–O cell size, and relatively large variations of intensity still obtained.

Slightly different criteria are utilized in choosing electro-optical crystals to be used for a deflector rather than a modulator. In a deflector, a crystal is chosen which shows a large change in the index of refraction for either the ordinary or extraordinary ray when an electric field is applied. The crystal is then ordinarily oriented so that a linearly polarized incident beam entering the crystal has an electric field vector in the direction of the ray for which the large index of refraction change occurs. In a modulator, however, the electro-optical crystal is chosen so that there is a large difference between the indices of refraction for the ordinary and extraordinary rays when a field is applied. That is, a good modulator can be made from a material in which the index of refraction increases for one of the rays and decreases for the other ray so that the phase difference induced between the two rays will be large even though the index for either of the two rays may not change as much as in some other materials.

Figure 2:
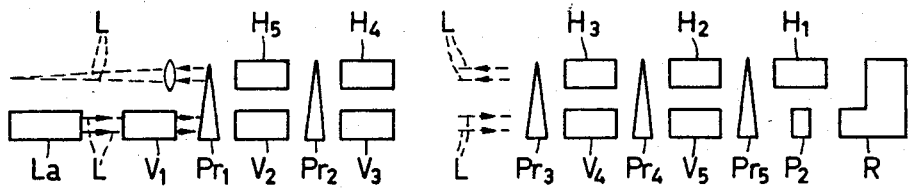
Figure 3:
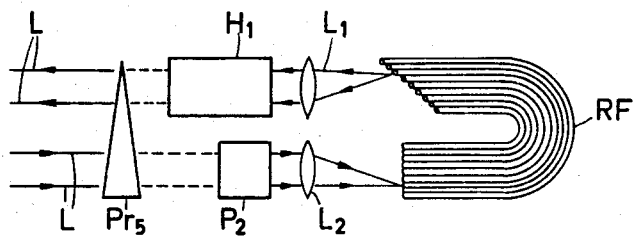

Further features of the invention may be determined from the following detailed description and figures wherein:

FIGURE 1 is a perspective view in block diagram form of a light deflection system utilizing the invention; FIGURE 1A is a block diagram showing of a modulation apparatus which may be substituted for the deflection apparatus in the system of FIGURE 1; FIGURE 2 is a cross-sectional view of the deflector of FIGURE 1 along line 2—2; FIGURE 3 is a schematic representation of a modified light deflector utilizing the invention; FIGURE 4 is a schematic representation of a further modified light deflector; FIGURE 5 is a cross-sectional view of a portion of the deflector of FIGURE 4; and FIGURE 6 is a schematic showing of another light deflector modification. Corresponding parts of various figures have been numbered with corresponding numbers prefixed by different numbers in the hundreds digit.

The system of FIGURE 1 includes a light source 10 which directs a light beam through a polarizer 11 and a beam splitter 12 to a deflector, generally designated 13. The amount of deflection imparted to the beam by deflector 13 is controlled by control signal means, such as deflection signal source 14. After emerging from deflector 13, light from source 10 impinges upon a mirror 15 positioned to intercept the beam emerging from deflector 13 and to redirect the beam back into deflector 13. Light from source 10 emerges from deflector 13 a second time and returns to beam splitter 12 where at least a portion of it is reflected to a utilization means 16.

Light source 10 may be any source of infrared, visible, or ultraviolet radiation, but is preferably a highly monochromatic, coherent source, such as a laser, so that the light beam can be intense and well focused if desired. Polarizer 11 can be any of a number of devices, such as a Nicol prism, and can be used to polarize the light beam circularly, elliptically or linearly, preferably linearly. Beam splitter 12 may also be any of a number of well known devices such as a half silvered mirror. Mirror 15 may be a high quality plane mirror. Utilization means 16 may be a display device, an optical memory, or any other device for utilizing a deflected or modulated light beam.

Detailed construction of deflector 13 can be seen from FIGURES 1 and 2. Deflector 13 is a composite prism including a triangular prism of electro-optical material 20 which intimately contacts a prism of compensating material 21 along an interface 22. The composite prism has a pair of substantially parallel end faces, one of which is coated with an antireflective coating 23, and the other of which is coated with a reflective coating 24. Antireflective coating 23 may be any of a number of well known coatings, such as a multi-layer dielectric quarter wave plate. Reflective coating 24 may also be any of a number of well known coatings such as a metallic coating or a dielectric reflecting material. A pair of electrodes 25 and 26 are deposited on the opposite substantially parallel triangular end faces of electro-optical crystal 20. Deflection signal source 14 is connected between the two electrodes 25 and 26. The compensating prism is not necessary but is convenient for tracing the beam through deflector 13. Compensator 21 could be replaced by an E–O material oriented and supplied with deflection signals so as to give additional deflection.

In operation, light source 10 emits a beam of light, of which a top ray 30 and a bottom ray 30' are shown. The beam passes through polarizer 11 which polarizes the beam linearly in a direction perpendicular to the plane of the drawing. The polarized beam then passes through beam splitter 12, strikes antireflective surface 23, and enters deflector 13 through compensating prism 21. To simplify the explanation, beam refraction caused by the reflective and antireflective surfaces has been ignored. As shown, compensator 21 has an index of refraction matching that of electro-optical crystal 20 when no signal is applied by deflection signal source 14. Therefore, rays 30 and 30' are refracted upon entering compensator 21 but are not refracted at interface 22. Rays 30 and 30' traverse compensating prism 21 and electro-optical prism 20 to the reflective surface 24 and are reflected therefrom back through the composite prism a second time as rays 31 and 31'. The beam traverses a predetermined volume of prism 20 during the first pass and is reflected back through a volume substantially superimposed upon the predetermined volume by reflective surface 24. The degree of nonoverlap has been exaggerated in FIGURE 2 for the sake of clarity. Rays 31 and 31' are refracted upon leaving compensating prism 21 and emerge at an angle equal to the incidence angle displaced from the point of incidence. The beam then travels in the surrounding medium until it is intercepted by mirror 15 which is placed perpendicular to the incident undeflected beam so that the beam is reflected back upon itself and returns in the direction of deflector 13. The beam retraces its original path traversing a volume substantially superimposed upon the volume it traversed during the first two passes, until it strikes beam splitter 12 where at least a portion of it is reflected upward as shown by rays 32 and 32', to strike a surface of utilization means 16.

When it is desired to deflect the beam, deflection signal source 14 provides a difference in potential between electrodes 25 and 26. Deflection signal source 14 could be in series with a D.C. bias source in the case of a quadratic effect, such as in KTN. Application of the potential across electro-optical prism 20 results in the generation of an electrical field therein and causes changes in the indices of refraction for the ordinary and extraordinary rays passing therethrough. With the incident light beam polarized in the manner described, its vector is in the direction of an extraordinary ray. Therefore, incident rays 30 and 30' are refracted to the positions shown by rays 33 and 33', respectively, at the interface 22. Top ray 33 travels a longer path in electro-optical prism 20 than does lower ray 33' before striking reflective surface 24. After reflection, top ray 34 again travels a longer path in electro-optical prism 20 than does lower ray 34'. Therefore, the optical path length differences, which result in beam deflection, are cumulative for the first two passes through electro-optical prism 20. Rays 34 and 34' are again refracted at interface 22 and upon leaving compensating prism 21.

Due to the beam deflection achieved, rays 34 and 34' emerge from deflector 13 at an angle slightly different from the angle of incidence and proceed toward mirror 15. Since the deflected beam is incident on mirror 24 at an angle slightly different from that of the undeflected beam, it is no longer normal to the surface of mirror 15 and is reflected back along a path slightly different from its incident path. The top and bottom rays of the beam reflected from mirror 15 are indicated by numerals 35 and 35', respectively. The beam then reenters deflector 13 and is deflected in a manner similar to that described above emerging with top ray 36 and bottom ray 36'. It should be noted that the top ray of the beam, now indicated by rays 35 and 36, again have a longer path than bottom ray 35' and 36' in the electro-optical prism 20 during each of the two passes so that the path length differences provided during the first two passes are added to the path length differences of the next two passes through deflector 13.

The beam finally emerges from deflector 13 and proceeds toward beam splitter 12 with an angular deflection four times as large as that which would be achieved by a single pass through an electro-optical prism of the same size as prism 20. Emergent rays 36 and 36' strike beam splitter 12 displaced from the position in which rays 30 and 30' struck it and also at a different angle than the latter two rays struck. Therefore, the deflected beam is reflected upward as shown by rays 37 and 37', towards utilization means 16 at an angle different than that at which rays 32 and 32' approach it. If utilization means 16 is properly positioned, the deflected and undeflected beam positions can be spatially separated before impinging thereon.

In the system of FIGURE 1, the beam passes through electro-optical prism 20 four times but does not utilize a volume within prism 20 substantially greater than the traversable in a single pass. An active volume may be defined in prism 20 which is bounded by the outer limits of the volumes of the prism traversable by the beam during its penultimate and ultimate passes through prism 20. With the deflections shown in FIGURES 1 and 2 assumed to be the maximum achievable in each pass through prism 20, the active volume is bounded by the crystal faces carrying electrodes 25 and 26, the left and right faces of prism 20, and the planes, perpendicular to the plane of FIGURE 2, containing rays 31' and 36. The light beam, whether deflected or undeflected, is always redirected into the active volume by reflective surface 24 and mirror 15.

Many modifications can be made to the system of FIGURE 1 without departing from the contemplated scope of the invention. For example, the deflected and undeflected beams may be focused by a lens suitably positioned so that very small spots instead of large beams will impinge upon utilization means 15. Additionally, if it is desired to return an undeflected beam to a position spaced from the light source without the use of beam splitter 12, light source 10 and polarizer 11 may be moved slightly to the side with respect to deflector 13 so that the beam strikes antireflective surface 23 at an angle slightly off the perpendicular to the surface in both the horizontal and vertical directions. Plane mirror 15 may then be replaced by a pair of mirrors intersecting at approximately 90° and of suitable dimensions so that the undeflected beam will return in a position beside light source 10 rather than directly into the source. Electro-optical prism 20 need not be triangular, so long as the opposite faces through which the light travels are nonparallel. Also, reflective surface 24 may be spaced from the back face of prism 20.

A light modulation system can be constructed by substituting the apparatus shown in FIGURE 1A for deflector 13 and deflection signal source 14 in the system of FIGURE 1. FIGURE 1A discloses a modulator generally designated 113, and control signal means, here shown as modulation signal source 114. Modulator 113 includes an electro-optical crystal 120 in a form of a prism having substantially parallel opposite end faces covered by an antireflective coating 123 and a reflective coating 124, respectively. Prism 120 also has opposite substantially parallel faces on which electrodes 125 and 126 are deposited. Electro-optical prism 120 may be cut so that light passing through the crystal will have the extraordinary ray lying in a plane perpendicular to electrodes 125 and 126. When the system of FIGURE 1 is utilized as a light modulation system, polarizer 11 is normally positioned so that light from source 10 is linearly polarized at some angle other than perpendicular to the planes of electrodes 125 and 126. The linearly polarized light is then broken up into ordinary and extraordinary components when it enters modulator 113.

When no modulation signal is present, the indices of refraction for the ordinary and extraordinary rays have a predetermined relation which results in a predetermined polarization of the emerging beam. When a modulation signal is applied, the potential between electrodes 125 and 126 generates an electric field in prism 120 and the indices of refraction for the ordinary and extraordinary rays in prism 120 change by differing amounts and one of the rays is retarded with respect to the other. The beam emerging from the final pass through prism 120 therefore has a polarization different from that of the unmodulated beam. By inclusion of an analyzer in utilization means 16, beam intensity differences can be detected as the modulating signal applied varies in magnitude. Since the end faces of the electro-optical crystal are parallel in this modification, no beam deflection occurs when a modulation signal is applied.

Both the light modulator and light deflector of this invention are analog devices. That is, continuous variation of the input signal magnitude causes continuous variation in the magnitude of the deflection or modulation produced.

FIGURE 3 shows a schematic side view of a modified deflector arrangement for use in the system of FIGURE 1. The arrangement of FIGURE 3 utilizes two external reflective surfaces 40 and 41 to increase the number of passes through a deflector 313 thereby increasing the amount of total deflection available. In FIGURE 3, the light beam passes through electro-optical prism 320 six times. For clarity in showing how these passes are obtained, only the center ray of the undeflected beam has been shown. An incoming ray 50 from a source strikes antireflective surface 323 and passes through the electro-optical prism 320 twice emerging as ray 51. Ray 51 strikes mirror 40, which is positioned so that the incoming ray is slightly off the perpendicular to the mirror face. Reflected ray 52 returns at a slightly different angle to antireflective surface 323, passes through deflector 313 twice, and emerges as ray 53. Ray 53 strikes reflective surface 41 which is also placed at a slight angle off the normal to incoming ray 53. Ray 54, reflected from surface 41, strikes antireflective surface 323 at an angle slightly different from that at which ray 53 emerged. The beam then passes through deflector 313 twice more with the center ray emerging as ray 55 directed toward a utilization means. When a deflection signal is applied, the beam is deflected in a manner similar to that described with reference to FIGURES 1 and 2.

The index of refraction of a compensating prism 321 may be chosen to match the index of electro-optical prism 320 when no signal is applied, or it may be chosen to match the index of refraction for the ray to be deflected at some predetermined signal magnitude.

FIGURES 4 and 5 disclose a further modification of a deflector arrangement which may be utilized in the system of FIGURE 1. FIGURE 4 is a schematic side view of the deflector and mirror arrangement and FIGURE 5 is a cross-sectional view of deflector 213. A pentaprism structure is utilized to obtain 12 passes through electro-optical prisms 220. Prism 220 has a deflective surface 224 in intimate contact with one face, an antireflective surface 223 in contact with a second face, and a compensating prism 221 in intimate contact with a third face at interface 222. Compensating prism 221 and electro-optical prism 220 form a composite prism having substantially parallel pentagonal side faces and a pentagonal cross-section. Compensating prism 221 has a reflective surface 227 in intimate contact with one face and a reflective surface 228 in intimate contact with a second face. The crystal of electro-optical material is chosen and cut so that a beam of linearly polarized light can pass through it in both the horizontal and vertical directions as an ordinary ray during both passes or as an extraordinary ray during both passes.

The rays shown in FIGURES 4 and 5 are the center rays of a undeflected beam. Ray 60 of an incoming beam passes through the electro-optical crystal 220 and is reflected from surface 227 to surface 228, then through electro-optical crystal 220 a second time in the vertical direction to reflective surface 224. From surface 224 the ray is reflected back through electro-optical crystal 220 to surface 228, then to surface 227 and back through electro-optical crystal 220 in the horizontal direction to emerge as ray 61. It can be seen that during these four passes through electro-optical prism 220 a top ray of the incoming beam passes through a thicker part of the electro-optical crystal in each of the four passes than does the bottom ray of the same beam. Therefore, each of the four passes provides additive deflections. It is assumed here that the light is polarized perpendicular to the plane of the figure so that the E–O effect is the same for a beam traveling vertically or horizontally.

Emerging ray 61 impinges upon a first reflective surface 240 and is reflected as ray 62 back into deflector 213. After four more passes through the electro-optical prism 220, the beam emerges with ray 63 as the center ray. Ray 63 impinges upon reflective surface 241 and is reflected as ray 64 which again passes through electro-optical prism 220 four times and emerges as ray 65. Ray 65 is directed toward a utilization means.

FIGURE 6 schematically shows another modification of a light deflector using the invention. An E–O prism 620 is in the form of an equilateral triangle. Compensators 621 and 670 are in intimate contact with two sides of prism 620 and provide first and second pairs of reflective surfaces 627 and 628, and 671 and 672, respectively, for redirecting a beam through essentially the same volume of prism 620 in substantially different directions. Surfaces 627 and 628 intersect at an angle of about 60° as do surfaces 671 and 672. A ray 80, directed into the deflector 613, passes through prism 620 six times before emerging as ray 81. Proper choice of materials and polarization direction yields cumulative deflection increments for each pass.

The embodiments of the invention in which an exclusive property or right is claimed are defined as follows:

1. A light beam control device comprising:
    electro-optical means for receiving and transmitting an incident light beam wherein the electro-optical means has a pretedermined volume transversable by the light beam in a single pass therethrough;
    reflective means, including a plurality of reflecting surfaces, positioned with respect to the predetermined volume for intercepting the light beam a predetermined number of times and for redirecting the intercepted light beam into a volume of the electro-optical means for a predetermined number of transversals, each transversal being substantially superimposed upon the predetermined volume; and
    means for applying a predetermined control signal to the electro-optical means for cumulatively controlling the light beam on each transversal of the electro-optical means by an amount dependent upon the predetermined control signal, the light beam emerging from the electro-optical means after the predetermined number of transversals being thereby cumulatively controlled.

2. A device according to claim 1 wherein:
    the reflective means includes first and second reflective surfaces positioned so that the first reflective surface intercepts the light path after a transverse through the electro-optical means and redirects it toward the second reflective surface which, in turn, intercepts the light path and redirects it into the electro-optical means.

3. A light deflector comprising:
    a device according to claim 1 wherein the electro-optical means includes a prism of electro-optical material having first and second substantially parallel faces connected by a plurality of faces, at least two of the plurality of faces being non-parallel and arranged so that the light beam entering one of the non-parallel faces impinges on the other, and the means for applying a control signal include electrode means on the first and second faces adapted to apply a deflection signal.

4. A light deflector according to claim 3 wherein:
    the first and second faces are triangular and are connected by third, fourth and fifth faces, the third and fourth faces being non-parallel and arranged so that the light beam enters the electro-optical means through the fourth face and traverses through the electro-optical means to the third face, and
    the reflective means includes a first reflective surface in intimate contact with the third face for intercepting and redirecting the light beam through the electro-optical prism and a second reflective surface spaced from the prism for receiving and redirecting the light beam, redirected by the first reflective surface, back into the prism.

5. A light deflector comprising:
    a device according to claim 1 wherein the electro-optical means includes a prism of electro-optical material having first and second triangular substantially parallel faces connected by third, fourth, and fifth faces;
    the means for applying a control signal include electrode means connected to the first and second faces adapted to apply a deflection signal;
    a compensating prism having a shape substantially identical to that of the prism of electro-optical material and an index of refraction matching one of those of the electro-optical material at a predetermined signal magnitude, the compensating prism further having a sixth face in intimate contact with the fourth face and having a seventh face substantially parallel to the third face;
    antireflective means in intimate contact with one of the third face and the seventh face for receiving and transmitting an incident light beam;
    and wherein the reflective means includes a first reflective surface in intimate contact with the other of the third face and the seventh face for intercepting and redirecting the light beam through the electro-optical prism and a second reflective surface spaced from both prisms for receiving and redirecting the light beam, redirected by the first reflective surface, back into the prisms.

6. A light deflector comprising:
    a device according to claim 1 wherein the means for applying a control signal applies a deflection signal and the reflective means includes means for redirecting the intercepted light beam through the electro-optical means in a direction substantially different from that of a previous traverse.

7. A light deflector according to claim 6 wherein:
    the electro-optical means includes a prism of electro-optical material of a type which provides light beam deflection in response to an applied electrical field, the prism having first and second triangular substantially parallel faces connected by third, fourth and fifth faces, the fifth face having antireflective means in intimate contact thereto for receiving and transmitting an incident light beam,
    the means for applying a control signal includes electrode means on the first and second faces, and
    the reflective means includes first, second, and third reflective surfaces, the first reflective surface position in intimate contact with the third face, the second and third reflective surfaces positioned adjacent the fourth face so that the second reflective surface intercepts the deflected light beam after a first traverse through the crystal and redirects it toward the third reflective surface which, in turn, intercepts the light path and redirects it through the prism toward the first reflective surface in a direction substantially perpendicular to that of the first traverse thereby causing cumulative deflection of the light beam exiting the electro-optical means after the predetermining number of traversals.

8. A light modulator for polarized light comprising:
    a device according to claim 1 wherein:
    the electro-optical means includes a prism of electro-optical material having first and second substantially parallel faces and having third and fourth substantially parallel faces which are substantially perpendicular to the first and second faces, one of the third and fourth faces being adapted to receive and transmit a light beam into the electro-optical material and the means for applying a control signal include electrode means connected to the first and second faces adapted to apply a modulation signal.
9. A light beam control system comprising:
a light source;
polarizing means for polarizing light from the source and
a device according to claim 1 positioned so that polarized light from the source is directed into the electro-optical means and wherein the means for applying a control signal include control signal generating means.
10. A method of controlling a light beam comprising the steps of:
passing a beam of light through a predetermined volume of electro-optical material traversable by the light beam in a single pass therethrough;
redirecting the beam through a volume of the electro-optical material for a predetermined number of traversals substantially superimposed upon the predetermined volume; and
applying a control signal to the electro-optical material for cumulatively controlling the light beam passing therethrough upon each tranversal.

References Cited
UNITED STATES PATENTS 3,290,619 12/1966 Geusic et al. _____ 350—150 X
3,329,474 7/1967 Harris et al. _____ 350—157 X DAVID SCHONBERG, Primary Examiner P. R. MILLER, Assistant Examiner U.S. Cl. X.R.
350—152, 157

April 7, 1970     S. DUINKER ET AL     3,504,958

TWO-DIMENSIONAL DIGITAL LIGHT-RAY DEFLECTION SYSTEMS

Filed Aug. 2, 1966

INVENTORS
SIMON DUINKER
UWE SCHMIDT
BY

AGENT